Sept. 29, 1936.  F. W. MANNING  2,055,871
JUICE EXTRACTION FILTER
Filed Nov. 21, 1932  6 Sheets-Sheet 1

INVENTOR
Fred W. Manning

Sept. 29, 1936.   F. W. MANNING   2,055,871
JUICE EXTRACTION FILTER
Filed Nov. 21, 1932   6 Sheets-Sheet 2
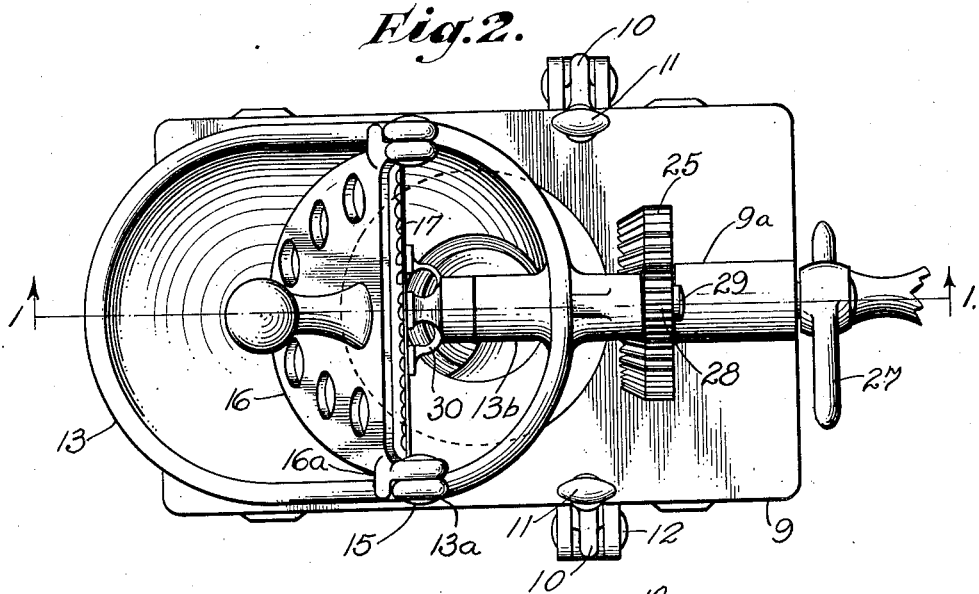
Fig. 2.
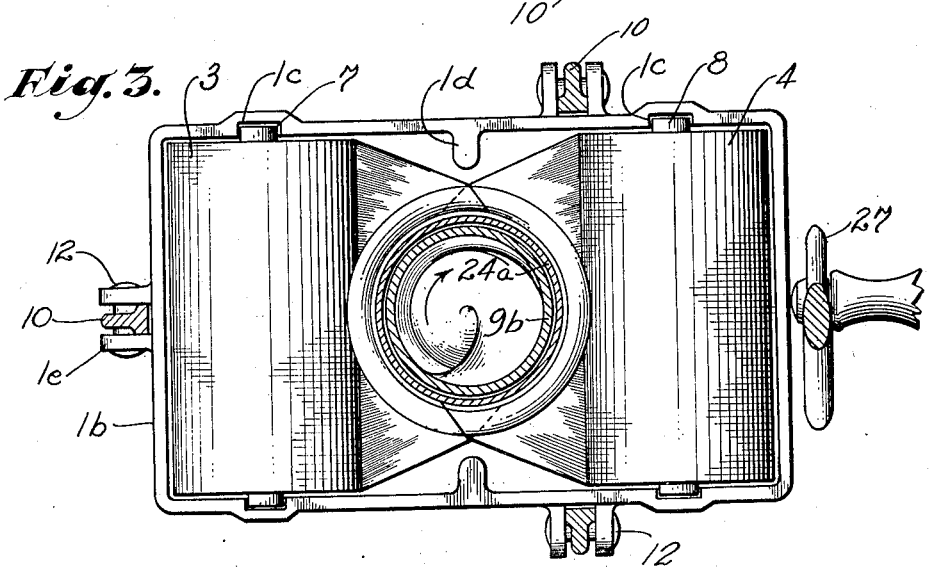
Fig. 3.
Fig. 6.
Fig. 5.
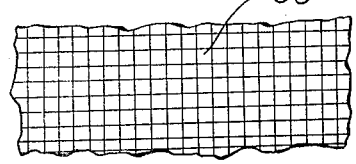
INVENTOR
Fred W. Manning

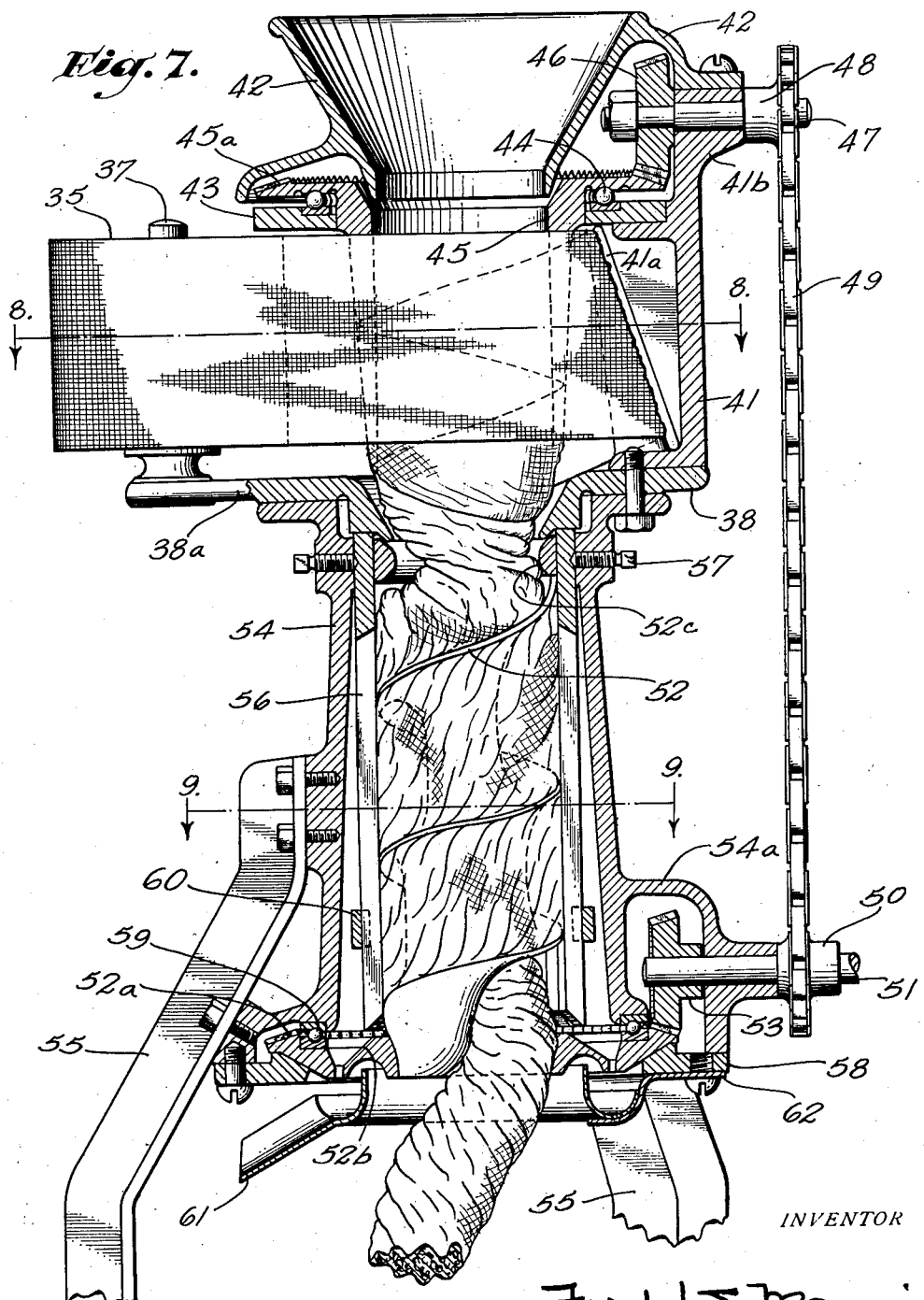

Sept. 29, 1936.  F. W. MANNING  2,055,871
JUICE EXTRACTION FILTER
Filed Nov. 21, 1932  6 Sheets-Sheet 4

INVENTOR

Fred W. Manning

Sept. 29, 1936.  F. W. MANNING  2,055,871
JUICE EXTRACTION FILTER
Filed Nov. 21, 1932  6 Sheets-Sheet 6

INVENTOR

Fred W. Manning

Patented Sept. 29, 1936

2,055,871

UNITED STATES PATENT OFFICE 2,055,871

JUICE EXTRACTION FILTER

Fred W. Manning, Los Angeles, Calif., assignor to F. W. Manning Co., Ltd., Los Angeles, Calif., a corporation of California Application November 21, 1932, Serial No. 643,583

10 Claims. (Cl. 100—48)

This invention relates to extraction filters, and is particularly directed to improved devices for extracting juices from fruits and vegetables; oils from seeds, nuts, olives, etc.; liquids from meats; and for all other purposes wherein it is desirable to clarify or otherwise treat liquids expressed from solids.

It has been the practice heretofore to express juices, etc., by means of such apparatus as continuous screw and hydraulic presses; and to clarify the expressed juices by passing them through some kind of a filter. This secondary operation, because of the attendant expense and difficulties involved, is usually accomplished very imperfectly or else omitted altogether. The result is that most of the juices so produced not only lack clarification, but are very often made from unwashed and partially decayed fruit and contain putrefactive bacteria. In fact, it is almost impossible to obtain a sparkling clear fresh juice drink from the best of washed fruit. Such beverages, particularly because of their vitamin values, should be available to all at all seasons of the year.

As distinguished from such prior methods, the present invention includes the advantages of combining the expressing and filtering operations in an inexpensive apparatus to enable the farmer, fruit grower, and housewife to convert their fruits and vegetables into brilliantly clear and sterile juices, free from insoluble solids, colloidal suspensions, micro-organisms, etc., for beverages, jellies, syrups, and the like.

In accordance with my invention the fruit or other solids are introduced into a disintegrating hopper where they are suitably grated or shredded, the disintegrated portions being discharged by gravity or under pressure within a filter fabric enclosure, the fabric having incorporated within it agents for decolorizing purposes, precipitating cream of tartar or other undesirable materials, and for other purposes. This enclosure becomes constantly more confining as a compression member causes both solids and fabric to move forward into an increasingly restricted area within a filter cage retaining wall, thereby causing the juice to be expelled from the solids and forced through the filter fabric, both solids and fabric being held within the retaining wall. After the juice has been expelled from the solids and filtered through the fabric, the solids and exhausted fabric are passed out of the apparatus; the feeding of the fabric through the machine being continued to remove all traces of solids, and to leave the machine in a substantially dry condition for further use, after which the fabric can be snipped off with a pair of scissors. Many of the features closely related to the present invention are disclosed in my Patents Nos. 1,686,095, 1,686,096, and 1,703,535. The filter fabric may consist of a coating of fibers of cellulosic or mineral origin precipitated on a structure of greater tensile strength than the fibrous coating, as disclosed in my Patents Nos. 1,782,784, 1,782,785, and 1,786,669, or it may consist of any other fabric structure that will supplement the wall of the compression chamber in retaining the solids during expelling of the liquid therefrom.

The invention is exemplified in the following description, and several forms of apparatus for carrying out the process are illustrated by way of examples in the accompanying drawings, in which:

Fig. 2 is a plan view of the extraction filter shown in Fig. 1.

Fig. 3 is a part plan view of the extraction filter shown in Fig. 1 with the hopper and fabric roll casing cover removed and screw ring in cross-section.

Fig. 5 is an extended elevation of a portion of the fabric cone of the modified construction of the screw cage shown in Fig. 4.

Fig. 6 is a cross-section of the extended portion of the fabric cone shown in Fig. 5.

Fig. 7 is a part vertical section of another type of juice extraction filter taken on line 7—7 of Fig. 8 with the fabric shown in elevation, in which the fabric is first passed around the solids to enclose them, and the screw is driven from its discharge end.

Figure 1:
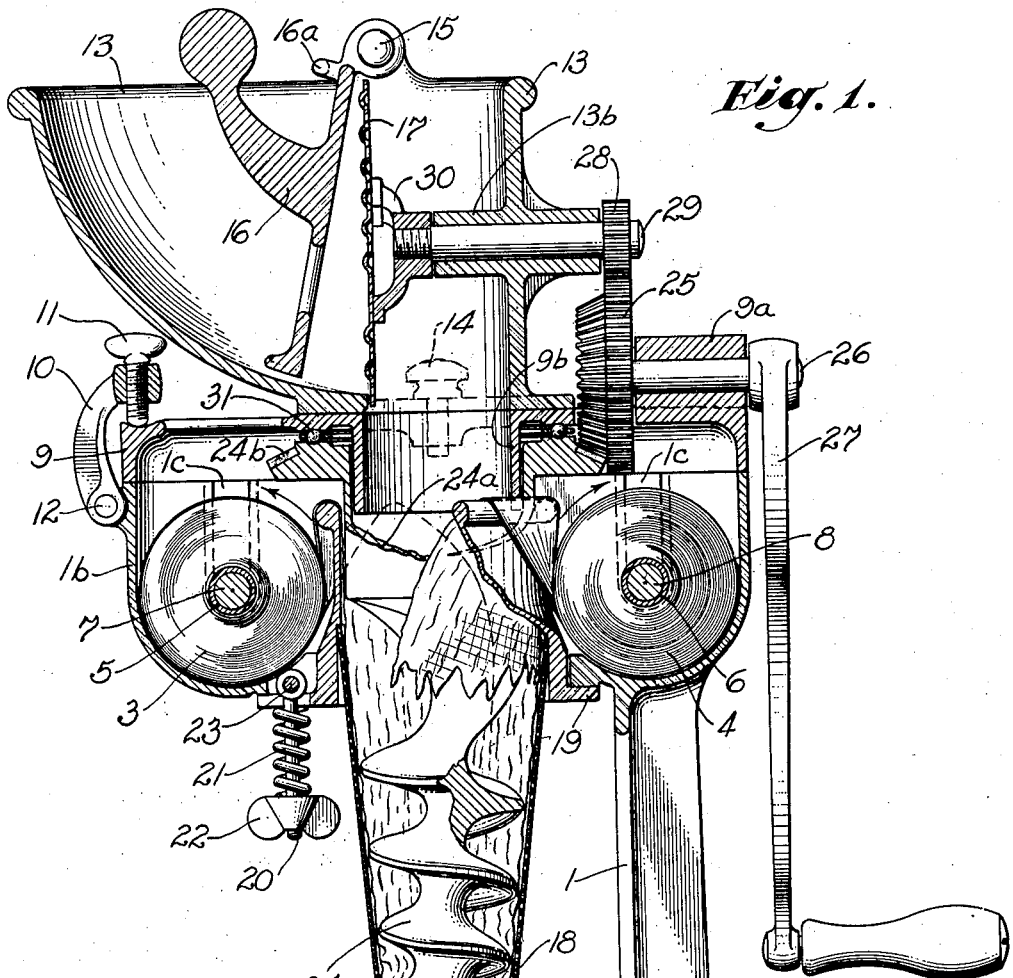
Fig. 1 is a part vertical section of a juice extraction filter taken on the line 1—1 of Fig. 2 with the screw shown mostly in elevation, in which the solids enter a fabric enclosure whose movement is substantially only in a downward direction.

Figs. 1, 2, and 3 show a construction in which 1 is a standard, which may be attached to a table by means of a foot 1a and a clamping screw 2. The upper part of the standard also forms a casing or enclosure 1b for the fabric rolls 3 and 4, which are wound upon tubes 5 and 6. These fabric rolls either rotate on rollers 7 and 8 or the rollers rotate, the latter being guided into and held in position by the recessed grooves 1c in the sides of the spool enclosure, which are strengthened by the central ribs 1d. The cover 9 for the spool enclosure has a driving shaft bearing 9a and a depending sleeve 9b, and is fastened in position by means of C bolts 10 and clamping screws 11, the bolts swinging on pins 12 which are driven through the lugs 1e of the spool enclosure. The receiving hopper 13 having a drive shaft bearing 13b is fastened to the spool enclosure cover by clamping screws 14, and is equipped with pins 15 driven through lugs 13a on its sides that support a swinging pressure plate 16, the latter being prevented from coming into contact with the disintegrating plate 17 by means of lugs 16a that engage with the sides of the hopper. The screw cage 18 having a juice gutter 18a is welded or otherwise fastened to a receiving tube 19 placed between the spools, and is spring resistantly engaged to the spool enclosure by means of swinging bolts 20, springs 21, and nuts 22, the bolts swinging on pins 23 driven into place in the spool enclosure. The compression member consists of a screw 24, the upper entrance portion of which is preferably integrally formed into a ring 24a, and bevel gear 24b; and the latter is driven by a gear 25 fastened to the driving shaft 26, which in turn is rotated by a hand crank 27 keyed to its outer end. The driving gear also engages with a spur gear 28 fastened to the outer end of a shaft 29, and on the inner end of this shaft is keyed a spider 30 that is bolted to the disintegrator plate. During inoperation of the apparatus the screw bevel gear may rest on the central ribs 1d, but during operation the ball bearing 31 will take the thrust of the screw.

Figure 4:
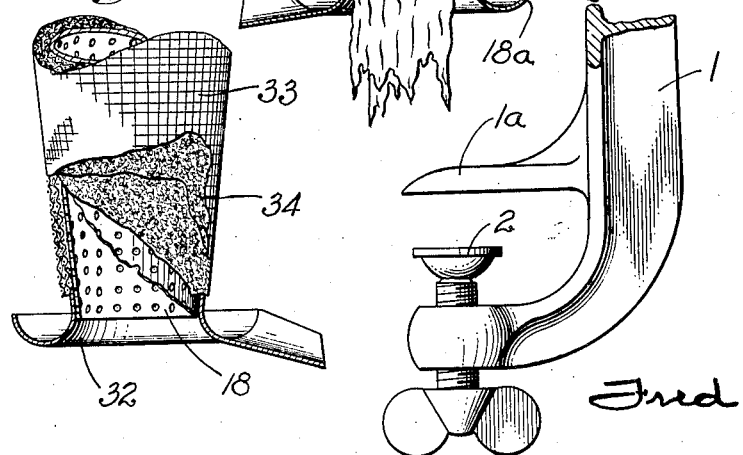
Fig. 4 is a part elevation and part vertical section of a modified construction of the screw cage shown in Fig. 1.

Figs. 4, 5, and 6 show a modification to the screw cage in that the juice gutter 32 is separate from the screw cage and may be slipped onto the end of the latter. This makes it possible to slip a fibrous cone snugly over the screw cage before placing the juice gutter in position, and the latter may also be used to hold the former in position. The cone consists of one or more layers of scrim or other fabric 33 coated with a suitable mixture of cellulose and/or asbestos fibres 34, as shown in the enlarged views in Figs. 5 and 6; and may be made up in similar manner to the fabric passed through the inside of the screw cage, the fibrous coating for both purposes being on the inner or fluid inlet side of the scrim. The cone may be used to give additional clarification to the expressed juices, and may be renewed when clogged with impurities filtered from the juices.

The operation of the apparatus just described has been in part indicated in connection with the foregoing description. The solids to be disintegrated are introduced into the cutting side of the hopper 13, the pressure plate 16 being used to keep the solids in contact with the cutting edges of the shredding plate 17. The solids during disintegration pass through the openings in the latter plate and fall by gravity through the annular ring 24a of the screw 24 into the enclosure formed by the fabric as it is pulled over the rounded edge of the receiving tube 19 by the compression screw 24. Both solids and fabric are then forced forward through the compression chamber formed between the filter or compression cage and the throat of the screw, and finally are extruded from the apparatus, the juice being expelled through the filter fabric and screw cage and caught in the gutter 18a from which it drains. The fabric after being extruded from the apparatus may be cut off, but generally a sufficient amount should be passed through after all of the solids have been expelled to clean out the machine and leave it substantially dry for future use. With this construction one or more spools may be used to supply the fabric required for filtration purposes, but in any case the edges should be made to overlap as shown in Fig. 3 so that the turning movement of the screw will not cause them to become separated and leave portions of the screw cage uncovered. Also, the fabric should be passed through the apparatus with its fibrous coating next the screw, the scrim being depended upon to preserve the continuity of the fibre coating and retain the fibres that form the coating.

Figure 8:
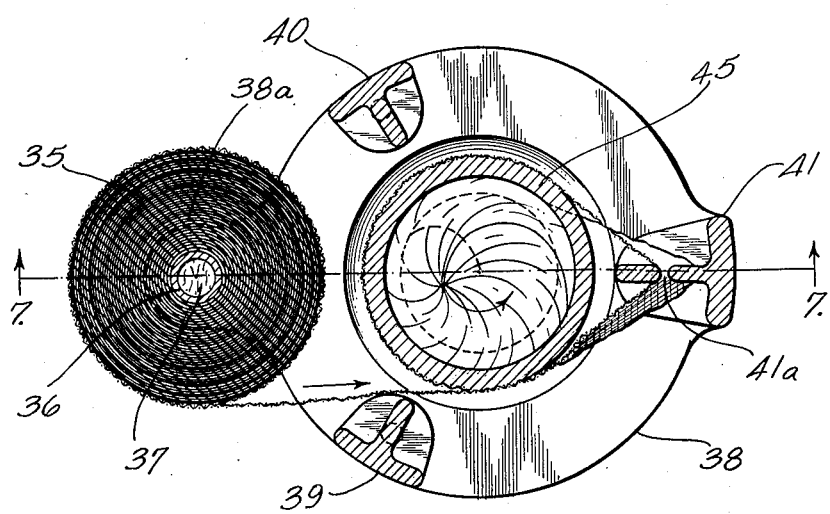
Fig. 8 is a cross-section of the extraction filter taken on line 8—8 of Fig. 7.
Figure 9:
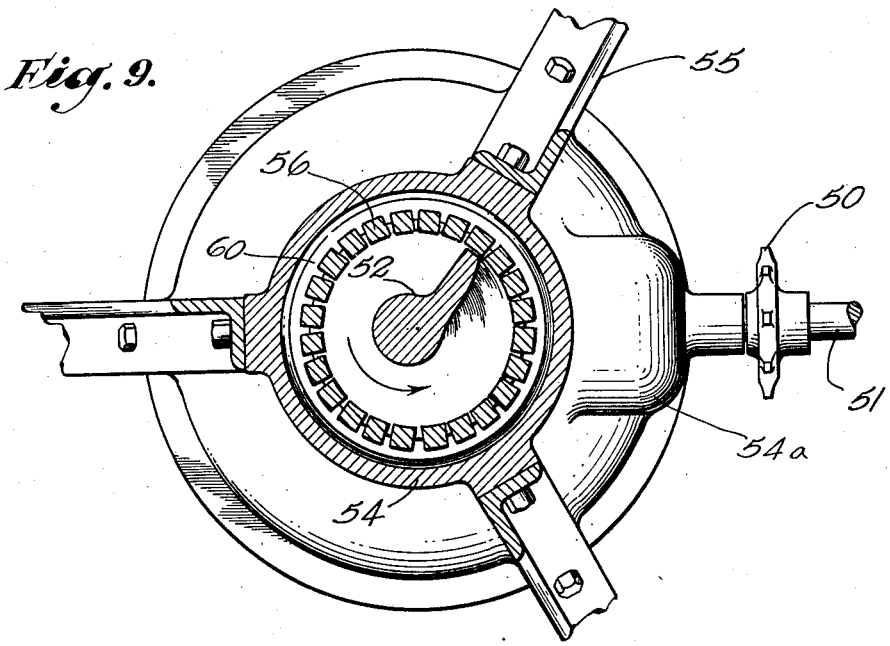
Fig. 9 is a cross-section of the extraction filter taken on line 9—9 of Fig. 7.

Figs. 7, 8, and 9 show a somewhat different construction in which the fabric roll 35 on a tube 36 is placed on and rotates about a vertical stationary post 37 which is fastened to a projecting arm 38a of the base plate 38. Three other posts, 39, 40, and 41, are also fastened to the base plate; the post 41 having an angular slot 41a for the passage of the fabric, and a shaft bearing 41b to which is bolted the hopper 42. These posts support a ring 43 in which is recessed a ball bearing 44 to take the weight of the rotatable sleeve 45. The upper flanged or gear ring portion 45a of the sleeve is driven by a bevel gear 46 that is fastened to the inner end of the upper driving shaft 47. A sprocket wheel 48 is fastened to the outer end of the shaft and is driven by means of a sprocket chain 49 also passing over a lower sprocket wheel 50 on the outer end of the lower drive shaft 51, and the latter is driven from a source of power not shown. The compression member consists of a screw 52, the discharge end of which is integrally formed into a ring gear 52a, in whose upper face is a juice gutter 52b, and whose feeding end is also formed into another ring 52c. The screw is driven by a bevel gear 53 which is fastened to the inner end of the lower drive shaft and meshes with the ring gear and is enclosed in the pocket 54a of the housing 54. This housing is supported on legs 55, and to its upper end is bolted the base plate of the hopper and fabric arrangement described above; and it encloses the screw cage 56 which it holds in position by means of set screws 57. During inoperation of the apparatus the weight of the screw is taken by a supporting ring 58 which is bolted to the lower end of the housing; during operation the thrust of the screw is taken by a ball bearing 59 placed between the ring gear and the lower end of the housing; and also during the latter period an adjustable ring 60 is used to regulate the expansion of the bars of the cage. A secondary juice gutter 61 is attached by brackets 62 to the screw supporting ring.

The operation of the apparatus described in Figs. 7 to 9 is somewhat different from the operation of the apparatus described in Figs. 1 to 3 in that the filter fabric is first wound into a receiving funnel for the solids, both of which are then drawn into the compression chamber formed between the contiguous bars 56 and the throat of the screw. This is accomplished by removing the fabric from the vertical spool 35, passing it first through an angular slot 41a in a stationary post 41, and then one or more times around the tapered rotating sleeve 45, and finally with the solids wrapped up within it, through the annular ring feeding entrance of the compression screw. The screw 52 keeps the fabric funnel with contained solids feeding in a downwardly direction, and the sleeve rotating at sufficient speed and in the same direction as the screw, prevents the latter from unrolling the fabric funnel. The hopper shown in this arrangement is used for solids that require no shredding, such as grapes, but it may be replaced by a disintegrating hopper similar to the one described in Figs. 1 and 2.

Figure 10:
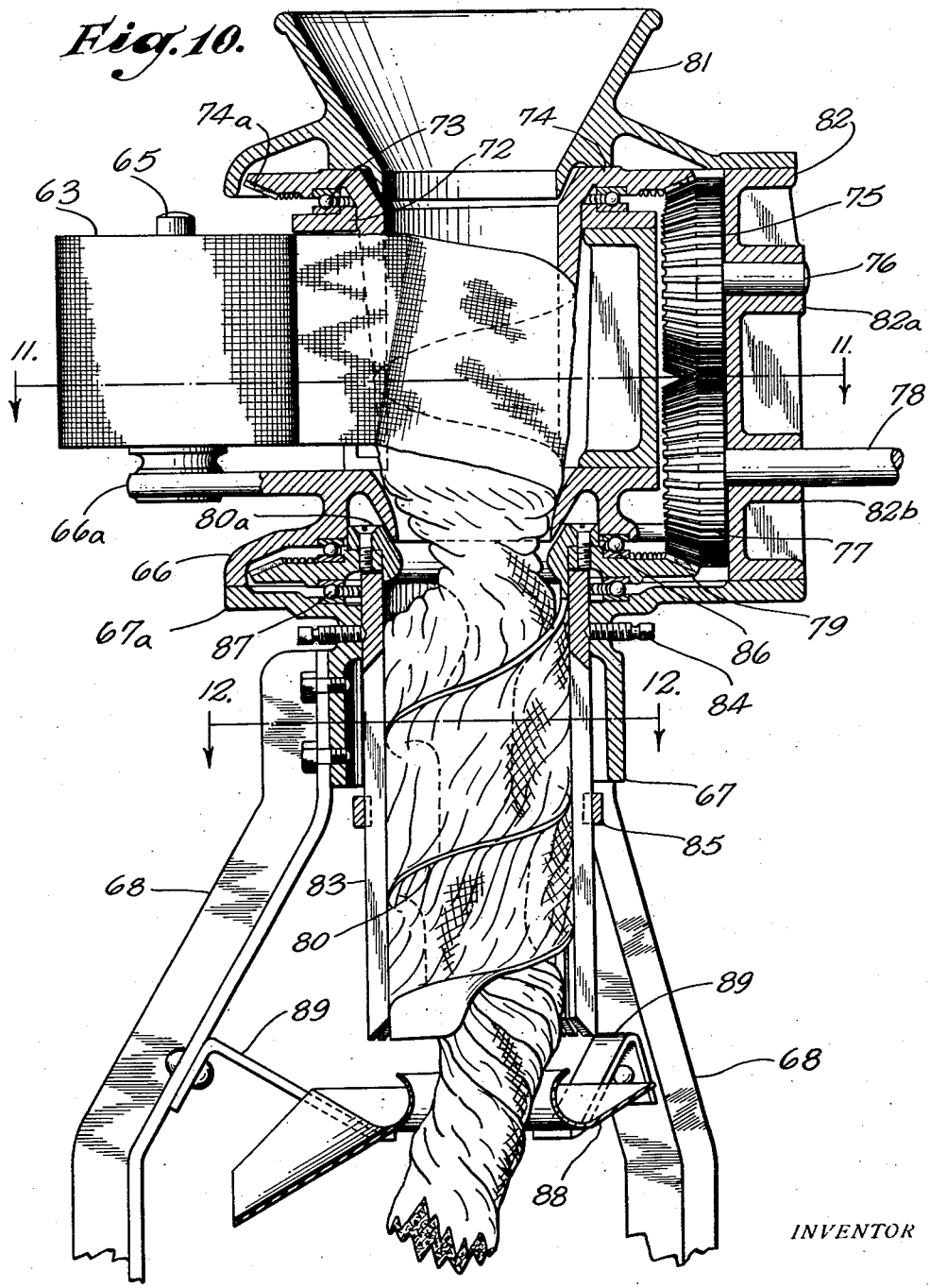
Fig. 10 is a part vertical section of another type of juice extraction filter taken on line 10—10 of Fig. 11 with the fabric shown in elevation, in which the fabric is also first passed around the solids to enclose them, and the screw is driven from its receiving end.
Figure 11:
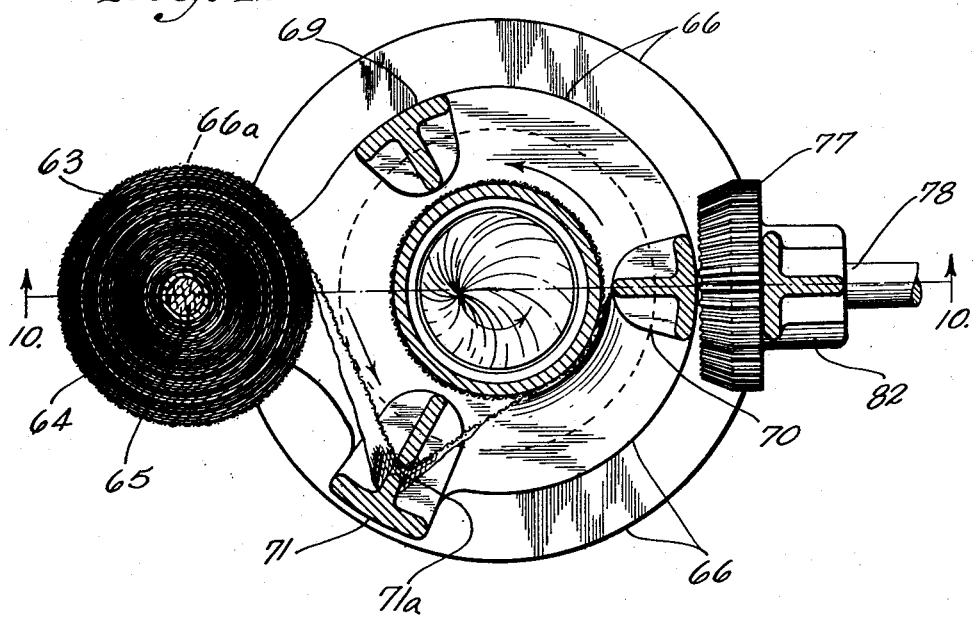
Fig. 11 is a cross-section of the extraction filter taken on line 11—11 of Fig. 10.
Figure 12:
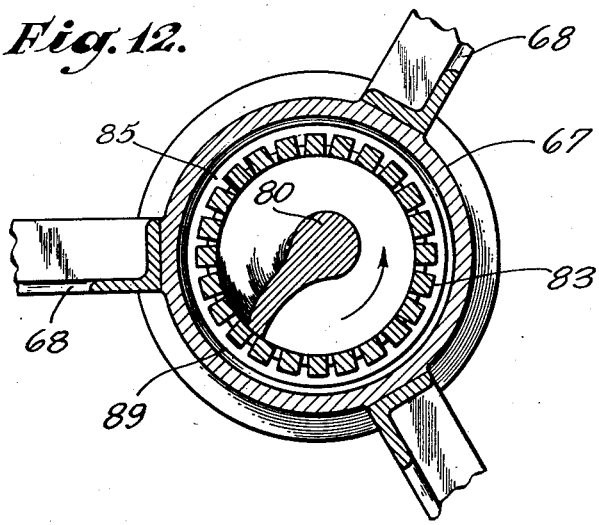
Fig. 12 is a cross-section of the extraction filter taken on line 12—12 of Fig. 10.

Figs. 10, 11, and 12 show another arrangement in which the fabric roll 63 on a tube 64 is placed on and rotates about a vertical stationary post 65 which is fastened to a projecting arm 66a of the base plate 66. This base plate is bolted to a flanged portion 67a of the housing 67, and the latter is supported by the legs 68. Three other posts 69, 70, and 71 are also fastened to the base plate, the post 71 having an angular slot 71a for the passage of the fabric. These posts support a ring 72 in which is recessed a ball bearing 73 to take the weight of the rotatable sleeve 74. The upper flanged or gear ring portion 74A of the sleeve is driven by a gear 75 fastened to a shaft 76. This gear also meshes with a similar gear 77 on the main drive shaft 78, which is driven from a source of power not shown. The latter gear is also used to drive the bevel ring gear 79 to which is bolted a ring 80a integrally formed in the feeding end of the compression screw 80. The hopper 81 is bolted to and supported by the bracket 82 which is fastened to the flanged portion of the housing, the bracket having bearings 82a and 82b for the two drive shafts. A cage 83 is enclosed within the housing and held in position by set screws 84, which pass through the latter into the former, an adjustable ring 85 being used to regulate the expansion of the bars of the cage during operation of the screw. A ball bearing 86, situated between the bevel gear and the base plate takes the thrust of the screw; and a ball bearing 87, placed on the underside of the bevel gear and in a recessed portion of the housing flange takes the weight of the screw. A gutter 88 supported by brackets 89 attached to the housing legs receives the extracted and filtered juice.

The operation of the apparatus described in Figs. 10 to 12 is very similar to that of the apparatus described in Figs. 7 to 9, except that the former show an arrangement in which the compression screw is driven from a ring gear that is bolted to a ring formed integrally with the feeding end of the screw, while Figs. 7 to 9 show a reverse driving arrangement in which the screw is driven from a ring gear formed integrally with the discharge end of the screw.

I claim as my invention:

1. In combination with a liquid expressing and clarifying apparatus: a hopper for receiving liquid containing solids; a supply roll of filter fabric; a guiding sleeve; and means whereby filter fabric is withdrawn from the supply roll and guided around the said sleeve so as to be wrapped helically in overlapping layers about the solids as received from the hopper.

2. In combination with a liquid expressing and clarifying apparatus; a hopper for receiving liquid containing solids; a supply roll of filter fabric; a guiding sleeve; means whereby filter fabric is withdrawn from the supply roll and guided around the said sleeve so as to be wrapped helically in overlapping layers about the solids as received from the hopper; and means for compacting the fabric enclosed solids to express liquid from the solids through their fabric enclosure.

3. In combination with a liquid expressing and clarifying apparatus: a hopper for receiving liquid containing solids; a supply roll of filter fabric; a guiding sleeve; means whereby filter fabric is continuously withdrawn from the supply roll and guided around the said sleeve so as to be wrapped helically in overlapping layers about the solids as received from the hopper; and means for continuously compacting the solids as they are enclosed in the filter fabric, to express liquid from the solids through their fabric enclosure.

4. A liquid expressing and clarifying apparatus comprising: a hopper for receiving liquid containing solids; a retaining wall enclosing a compression chamber; a compacting member in the compression chamber; a sleeve connecting the hopper to the compression chamber; a supply roll of filter fabric; and means for unwinding the fabric and moving the compacting member whereby fabric is withdrawn from the supply roll and guided around the sleeve so as to enclose the solids as received by the fabric enclosure from the hopper, and both solids and fabric enclosure are then compacted to express liquid from the solids through their fabric enclosure.

5. A liquid expressing and clarifying apparatus comprising: a hopper for receiving liquid containing solids; a retaining wall enclosing a compression chamber; a compacting member within the compression chamber; a sleeve connecting the hopper to the compression chamber; a supply roll of filter fabric; and means for moving the fabric about the sleeve and operating the compacting member whereby fabric is withdrawn from the supply roll and guided around the sleeve so as to be wrapped helically in overlapping layers about the solids as received from the hopper, and the enclosed solids are then moved relatively to the retaining wall to express liquid from the solids through their fabric enclosure.

6. A liquid expressing and clarifying apparatus comprising: a hopper for receiving liquid containing solids; a retaining wall enclosing a compression chamber; a compacting member within the compression chamber; a sleeve connecting the hopper to the compression chamber; a supply roll of filter fabric; and means for rotating the sleeve and operating the compacting member whereby fabric is withdrawn from the supply roll and guided around the sleeve so as to be wrapped helically in overlapping layers about the solids as received from the hopper, and the enclosed solids are then moved relatively to the retaining wall to express liquid from the solids through their fabric enclosure.

7. A liquid expressing and clarifying apparatus comprising: a hopper for receiving liquid containing solids; a retaining wall enclosing a compression chamber; a compacting member within the compression chamber; a sleeve connecting the hopper to the compression chamber; a supply roll of filter fabric; and continuous means for rotating the sleeve and operating the compacting member whereby fabric is withdrawn from the supply roll and guided around the sleeve so as to be wrapped helically in overlapping layers about the solids as received from the hopper, and the enclosed solids are then moved relatively to the retaining wall to express liquid from the solids through their fabric enclosure, and to expel the compacted solids and utilized fabric and provide fresh solids and fabric in their stead.

8. A liquid expressing and clarifying apparatus comprising: a hopper for receiving liquid containing solids; a circular retaining wall; a compacting screw whose convolutions form a compression chamber with the said wall; a feed ring extending across the screw and secured thereto through which solids may enter the compression chamber longitudinally of the screw; a sleeve connecting the hopper to the compression chamber; a supply roll of filter fabric; and means for rotating the sleeve and compacting screw whereby fabric is withdrawn from the supply roll and guided around the sleeve so as to be wrapped helically in overlapping layers about the solids as received from the hopper, and the enclosed solids are caused to enter the compression chamber through the feed ring and are moved relatively to the retaining wall to express liquid from the solids through their fabric enclosure and to expel the compacted solids and utilized fabric and provide fresh solids and fabric in their stead.

9. A liquid expressing and clarifying apparatus comprising: a hopper for receiving liquid containing solids; a circular retaining wall; a compacting screw within the retaining wall whose convolutions form a compression chamber with the said wall; a feed ring extending across the screw and secured thereto through which solids may enter the compression chamber longitudinally of the screw; a supply roll of filter fabric; and means for guiding the fabric and means for rotating the screw whereby fabric is withdrawn from the supply roll and guided so as to be wrapped helically in overlapping layers about the solids as received from the hopper, and the enclosed solids are caused to enter the compression chamber through the feed ring and are moved relatively to the retaining wall to express liquid from the solids through their fabric enclosure and to expel the compacted solids and utilized fabric and provide fresh solids and fabric in their stead.

10. A liquid expressing and clarifying apparatus comprising: a hopper for receiving liquid containing solids; a circular retaining wall; a compacting screw within the retaining wall whose convolutions form a compression chamber with the said wall; a feed ring extending across the screw and secured thereto through which solids may enter the compression chamber longitudinally of the screw; a sleeve connecting the hopper to the compression chamber; a supply roll of filter fabric; and means for guiding the fabric and means for rotating the screw whereby fabric is withdrawn from the supply roll and guided around the sleeve so as to enclose solids as received by the fabric enclosure from the hopper, and the enclosed solids are caused to enter the compression chamber through the feed ring and are moved relatively to the retaining wall to express liquid from the solids through their fabric enclosure and to expel the compacted solids and utilized fabric and provide fresh solids and fabric in their stead.

FRED W. MANNING.